Dec. 29, 1931.   H. C. ROBINSON   1,838,961
RELAY CONTROL SYSTEM
Filed Dec. 3, 1928
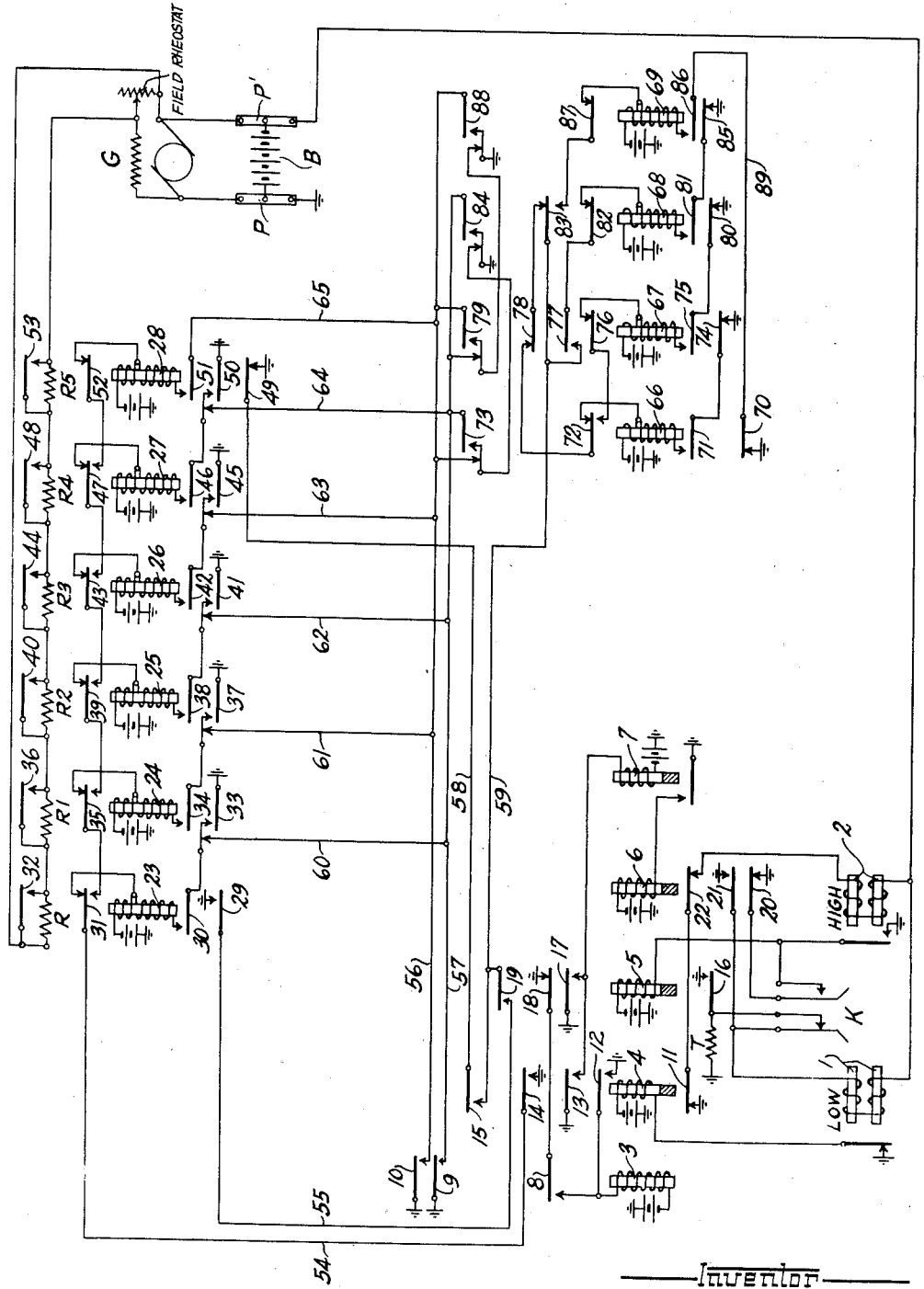
Inventor
Harold C. Robinson Patented Dec. 29, 1931

1,838,961

UNITED STATES PATENT OFFICE

HAROLD C. ROBINSON, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

RELAY CONTROL SYSTEM

Application filed December 3, 1928. Serial No. 323,292.

This invention relates to voltage regulation in general, but more particularly it pertains to devices for controlling the output of current generators so that the voltage of the storage batteries being charged is maintained within certain narrow limits under varying loads.

It is extremely important in factories where electrical equipment is manufactured that the voltage of the battery used for testing and gauging purposes is maintained practically at a constant value, the limits usually being plus and minus one-quarter of a volt from a certain set voltage.

I have assumed, therefore, as the principal object of my invention the provision of a voltage regulating device which will serve that purpose and which is easily and cheaply manufactured and is adaptable to batteries of all sizes without much change.

The product of my invention has for its principal feature the fact that it is constructed entirely of relays, not employing the usual motor-driven rheostat.

Other objects and features of the invention will be apparent from a perusal of the detailed description which follows when taken in conjunction with the accompanying single sheet of drawing.

In the drawing, the resistances R to R5 are connected in series and comprise a shunt circuit about the field rheostat of the generator of the motor-generator charging set which charges the battery B. The two-step relays 23 to 28, inclusive, have for their principal function the shorting-out of resistances R to R5, inclusive, to vary the charging rate of the generator by varying the field strength of the generator symbolically represented at G.

The generator at G is a shunt wound generator having the field rheostat in series with the field winding as diagrammatically shown. The generator brush leads are shown connected to the bus bars P and P'. The positive pole of the battery B is connected to the P bus bar and the negative pole to the bus bar P'. As the generator is continuously running at a constant speed, the battery is floated across the charging leads. The bus bar P is shown connected to ground.

Throughout the drawing there are shown a plurality of battery and ground connections. It is to be understood, however, that there is only one battery in the system, the ground symbols representing connections to the positive bus bar P and the battery symbols representing connections to the negative bus bar P'.

The relay 1 is what will be termed the low voltage, or low, relay. Its adjustment is such that when the voltage of the battery B drops below $46\frac{1}{4}$ volts, for example, it will deenergize. The relay 2 is the high voltage, or high, relay. Its adjustment is such that it will not energize sufficiently to attract its armature until the voltage of battery B reaches $46\frac{3}{4}$ volts, for example. The relays 3, 4, 5, 6, 7, 66, 67, 68, and 69 are controlled by the operation of relays 1 and 2 for controlling the operation of the relays 23 to 28, inclusive. Relays 1 and 2 are connected to bus bar P'.

When the voltage of battery B drops below the assumed low limit, $46\frac{1}{4}$ volts, the relay 1 operates in a manner which will be described in detail a little further on in the description to cause the energization of one or more of the relays 23 to 28, inclusive, to reduce the resistance of the shunt about the field rheostat of the generator to increase the charging rate of the generator, in the well-known manner.

The resistances R to R5 need not necessarily comprise a shunt about the field rheostat; they may be included in series with the field winding of the generator. In that case the operation of the system would be the same. But with the resistances in series with the field they must carry the whole load and must be of greater resistance, thus not allowing the finer adjustment.

When the voltage of the battery B goes above $46\frac{1}{4}$ volts the relay 1 ceases to operate and the charging rate remains at its new high value until the voltage increases to $46\frac{3}{4}$ volts, the assumed high limit. The load on the battery may be such that there is a considerable lapse of time before the high limit is reached. However, when that limit is reached, the high relay 2 operates in a manner which will also be described subsequently, to cause the deenergization of one or more of the relays 23 to 28, inclusive, which were energized as a result of the operations of the low relay 1, to increase the resistance of the shunt about the field rheostat to thereby decrease the output of the generator.

In actual practice, the number of relays similar to relays 23 to 28, inclusive, in use will be determined by the size of the battery and limits within which the voltage of that battery must be held.

Referring in detail to the drawing, it will be noted that the circuits of relays 1 and 2 are normally closed from the negative terminal of the battery or bus bar P' to ground. The circuit of relay 1 includes the contacts of key K and the resistance T, while that of relay 2 includes the armatures 22 and 11 of relays 6 and 4, respectively. As long as the voltage of B remains above 46¼ volts relay 1 will remain in its energized position and hold its armature in the attracted position. As soon as the voltage drops below 46¼ volts, relay 1 will not receive enough current from the battery through the resistance T to maintain its armature in the attracted position. Therefore, the armature detracts and engages its grounded resting contact, thereby completing the circuit of slow-to-release relay 4.

Relay 4 energizes upon the completion of its circuit and attracts its armatures 11 to 15, inclusive. At armature 11 relay 4 opens the circuit of relay 2. At armature 12 relay 4 completes the energizing circuit of relay 3. At armature 13, relay 4 completes the energizing circuit of relay 7. At armatures 14 and 15 relay 4 completes the energizing circuits of relays 23 and 66, respectively.

Relay 3 attracts its armatures when its energizing circuit is closed, and at armature 8 it completes a locking circuit for itself through armature 18 of relay 5. At armatures 9 and 10 relay 3 grounds the common locking conductors 57 and 56, respectively.

Relay 23, because it has only its upper winding in the energizing circuit, operates only its armature 30 to complete a locking circuit through its two windings in series to common locking conductor 57. The relay 23 will not energize completely until ground has been removed from conductor 54.

Relay 7 attracts its armature when its energizing circuit is completed and thereby completes an energizing circuit for relay 6. Relay 6 attracts its armatures 20, 21, and 22. At armature 22 relay 6 opens the circuit of relay 2 and at armature 21 it shunts out the resistance T so that relay 1 can again operate.

The energizing circuit of relay 66 which was completed at armature 15 of relay 4 is traceable from grounded resting contact of armature 49 of relay 28, armature 49, conductor 58, armature 15 and its make contact, conductor 59, armature 83 and its resting contact, armature 78 and its resting contact, armature 72 and its resting contact, upper winding of relay 66 to battery. Relay 66 is energized enough through its upper winding to attract only its armature 71 to complete a locking circuit through its two windings to ground through armature 74 of relay 67. As long as conductor 59 is grounded, relay 66 will not operate completely.

When relay 1 again attracts its armature as a result of the operation of relay 6, the circuit of slow-to-release relay 4 is opened and after an interval that relay deenergizes and detracts its armatures to disconnect ground from conductors 54 and 59 and to open the circuit of relay 7.

As a result of the disconnection of ground from conductors 54 and 59, relays 23 and 66 energize completely. Relay 23 at armature 32 short-circuits resistance R to reduce the resistance of the shunt circuit about the field rheostat to increase the charging rate of the generator; at armature 31, disconnects conductor 54 from its upper winding and connects it to the upper winding of relay 24; and at armature 29 connects ground to conductor 55 for a purpose to be described later. Relay 66 at armature 73 connects a substitute ground to conductor 57; at armature 72 transfers the conductor 59 to the upper winding of relay 67; and at armature 70 disconnects ground from conductor 89.

Slow-to-release relay 7 deenergizes an interval after its circuit was opened by the deenergization of relay 4 and opens the circuit of slow-to-release relay 6 which also deenergizes after an interval to remove the shunt from about resistance T. Relays 4, 6, and 7 are made slow-to-release to provide a time interval during which the voltage of the battery B may be slightly built up before resistance T is again included in the circuit of relay 1.

If the voltage of the battery has not been increased sufficiently to maintain relay 1 energized when the resistance T is again included in the circuit of relay 1, relay 1 will again deenergize to complete the same cycle of operations to further reduce the resistance of the shunt about the field rheostat to further increase the charging rate of the generator.

The second deenergization of relay 1 causes the energization of relays 24 and 67. These two relays operate similarly to relays 23 and 66. Relay 24, however, locks itself to conductor 56 instead of 57 and transfers the locking circuit of relay 23 to armature 33. At armature 35 relay 24 transfers conductor 54 to the upper winding of relay 25 and at armature 36 short circuits the resistance R1. Relay 67, at armature 74, opens the locking circuit of relay 66, allowing that relay to deenergize; at armature 77 transfers the conductor 59 to the winding of relay 68; and at armatures 76 and 78 disconnects its upper winding and the upper winding of relay 66 from the conductor 59. At armature 79, relay 67 connects ground to conductor 56.

Thereafter, relay 1 deenergizes each time the resistance T is included in its circuit if the voltage of the battery has not been raised above 46¼ volts. Each deenergization of relay 1 completes the cycle of operations just related to operate one of the relays 23 to 28, inclusive, and 66 to 69, inclusive. It is to be noted that every one of the relays 23 to 28, inclusive, which are energized by the deenergization of relay 1 remains locked up to the relay following it in operation and that the last one of the relays operated remains locked to either of the common locking conductors 56 and 57 depending upon which is the last relay operated. It is also to be noted that only one of the relays 66 to 69, inclusive, remains energized at any one time.

It is further to be noted that relays 23, 25, and 27 are temporarily locked up to conductor 57 and that the others are temporarily locked to conductor 56. In conjunction with this it will be remembered that one of the relays 66 and 68 operates with each operation of the relays 23, 25, and 27 to connect ground to the conductor 57 independent of armature 9 of relay 3 and that one of the relays 67 and 69 operates with each operation of the relays 24, 26, and 28 to connect ground to conductor 56 independent of armature 10.

It will now be assumed that after relay 28 has been operated, after six deenergizations of relay 1, the resistance of the shunt about the field rheostat has been reduced enough to allow the generator output to increase enough to build up the battery voltage to above 46¼ volts. Therefore, relay 1 receives enough current through the resistance T to maintain it energized. After a period of time the voltage will have been increased to 46¾ volts, the high limit.

When the high limit is reached high relay 2 receives enough current to attract its armature and in so doing completes the energizing circuit of relay 5. Relay 5 attracts its armatures 16, 17, 18, and 19. At armature 16 a circuit is closed for relay 1 independent of resistance T so that a momentary large load cannot cause the deenergization of that relay. At armature 17 the circuit of relay 7 is again completed and it functions as before. At armature 18 ground is disconnected from the locking circuit of relay 3. At armature 19 the grounded conductor 55 is connected to 59. Since it was assumed that relay 28 was the last relay of that group to have been operated, relay 67 will be in its operated position because relays 66 to 69 operate in consecutive order. Therefore, ground on conductor 59 is connected by way of armature 77 and its make contact and armature 82 and its resting contact to the upper winding of relay 68. Relay 68, being a two-step relay, will only operate its armature 81 to prepare its locking circuit which will be effective to fully operate the relay when ground has been disconnected from conductor 59 by the deenergization of relay 5.

Relay 6 in operating as the result of the operation of relay 7 opens the circuit of relay 2 by attracting its armature 22. Relay 2 immediately deenergizes, opening the circuit of the slow-to-release relay 5. Accordingly, relay 5 deenergizes after an interval to open the circuit of the slow-to-release relay 7 and to disconnect ground from conductor 59.

The disconnection of ground from conductor 59 allows relay 68 to operate fully to open the locking circuit of relay 67 at armature 80, to connect ground to conductor 57 at armature 84, and to connect the upper winding of relay 69 to conductor 59 at armature 83. Relay 67 deenergizes when its locking circuit is opened and disconnects ground from conductor 56 at its armature 79.

This disconnection of ground opens the locking circuit of relay 28, which relay deenergizes and detracts its armatures. In detracting armature 50, relay 28 transfers the locking circuit of relay 27 to conductor 57 which has just been grounded by relay 68 at its armature 84. In detracting its armature 52, relay 28 removes the short circuit of resistance R5 to increase the resistance of the field rheostat shunt. Thus the charging rate of the generator will be somewhat decreased.

Relay 7 deenergizes an interval after its circuit is opened and opens the circuit of relay 6 which also deenergizes after an interval. Relay 6 in deenergizing amongst other things detracts its armature 22 to complete the circuit of relay 2. If the voltage is still above the high limit, relay 2 will again energize to perform the same cycle of operations, this time, however, operating relay 69.

When relay 69 operates, it will cause the deenergization of relay 68. Thus ground is disconnected from conductor 57 by relay 68 and connected to conductor 56 by relay 69. The disconnection of ground from conductor 57 opens the locking circuit of relay 27 and that relay deenergizes removing the shunt from about resistance R4 and transferring the locking circuit of relay 26 to conductor 56. These cycles of operation continue until the voltage of the battery has been reduced to a point where the relay 2 will no longer operate.

Whenever the battery is not to be in use for a period of hours, it is the usual practice to disconnect the generator and the relay equipment therefrom. Before the generator is reconnected to the battery, it is advisable to build up the output of the generator to a point where its voltage is slightly above that of the high voltage limit of the battery.

In order to regulate the generator output the key K has been provided. The operation of this key to the left will open the circuit of relay 1 to cause that relay to deenergize to start the cycle of operations to reduce the shunt resistance. Relay 1 will continue to operate until the key K is released. In this manner the voltage of the generator output can be built up and it can be regulated to remain constantly at 47 volts, for example, before connecting the generator to the battery, by operating the key K to the left if too low and to the right if too high. The operation of the key K to the right operates the relay 5 as would relay 2. When the desired voltage has been reached the circuit breakers will be operated to connect the generator to the battery.

From the foregoing it will be seen that I have provided a voltage regulating arrangement which responds quickly and effectively to the variations in the voltage of the battery to control the input to the battery in such a manner that the voltage thereof will remain practically constant with a varying load.

Although the just described example has been chosen as an illustration of one application of my invention, it is not my intention to be limited to the exact disclosure, for there are adaptations and modifications which can be made by those skilled in the art without departing from the spirit and scope of the invention.

Having thus described by invention, what I consider new and desire to have protected by Letters Patent is pointed out in the appended claims.

What is claimed is:

1. In a control system, a chain of relays, a circuit controlled thereby, a second chain of relays, a first and second control relay and means for operating them, means responsive to the operation of the first relay for successively operating the relays in both chains to control said circuit, circuit means for maintaining the relays of the first chain operated after successive operations, circuit means for maintaining each relay in the second chain operated until the succeeding relay of that chain is operated, and means responsive to the operation of the second control relay to continue the successive operation of the second chain of relays to manipulate the maintaining circuit means of the first chain to successively deenergize the relays of the first chain one at a time in the order reversed to that in which they were energized to control said circuit.

2. In a control system, a first chain of relays, a second chain of relays, a pair of holding circuits, means for operating the relays of the first chain successively, means for locking alternate ones of said operated relays to alternate ones of said holding circuits, and means for operating the relays of the second chain successively to open said locking conductors alternately to cause the successive deenergization of the operated relays of the first chain.

3. In a relay system, a first series of relays, a second series of relays, a first and a second control relay, means for periodically operating said control relays, means responsive to the periodic operations of the first control relay for simultaneously energizing one of each of said first and second series of relays for each periodic operation and in a definite order, circuit means for maintaining energized all of the energized relays of the first series, means responsive to the periodic operations of the second control relay for energizing one of said second series of relays for each periodic operation, and means operated by said second series of relays for manipulating said maintaining circuit means to deenergize the energized relays of the first series one at a time and in an order reverse to that in which they were energized.

4. In a relay system, a chain of relays, a pair of holding circuits for said relays, means for energizing said relays successively, locking means operated by said relays for locking themselves energized and for locking the last energized relay to one of said holding circuits, alternate last energized relays being locked to alternate holding circuits and means operated by said first means for manipulating said holding circuits to deenergize said relays successively in an order reverse to that in which they were energized.

5. In a relay system, a chain of relays, a pair of control relays, means for periodically operating said control relays, a pair of holding circuits, means responsive to the periodic operations of one control relay for successively energizing the relays of said chain one for each periodic operation, means for alternately locking the last energized of said relays to alternate ones of said holding circuits, and means responsive to the periodic operations of the other control relay for alternately manipulating the holding circuits to deenergize the energized relays of said chain successively.

6. In a relay system, a chain of relays, a pair of holding circuits for said relays, a pair of control relays, means for periodically operating said control relays, means responsive to the periodic operations of one control relay for successively energizing said chain of relays one for each periodic operation, means operated by each relay for locking itself to one of said holding conductors to maintain itself energized and establishing a holding circuit for the precedingly energized relay which is independent of said pair of holding circuits, alternate ones of the relays of the chain locking themselves to alternate ones of said pair of holding circuits, and means responsive to the periodic operations of the other control relay for alternately opening said pair of holding circuits for successively deenergizing the energized ones of the relays of the chain one for each periodic operation of said other control relay.

7. In a relay system, a chain of relays, an individual holding circuit for each of the relays, a pair of common holding circuits, a pair of control relays, means for periodically operating said control relays, means responsive to the periodic operations of one of said control relays for energizing the relays of said chain one for each periodic operation and in a definite progression, means operated by each relay for locking itself energized to one of said common holding circuits and transferring the holding circuit of the previously energized relay from one of the common holding circuits to its individual holding circuit, alternate ones of said relays locking themselves to alternate ones of said common holding circuits, and means responsive to the periodic operations of the other control relay for alternately opening the common holding circuits to deenergize the energized ones of the relays of the chain one for each periodic operation of said other control relay and in a progression opposite to said definite progression, each relay of the chain upon deenergizing, transferring the holding circuit of the preceding relay of the definite progression from its individual holding circuit to one of said common holding circuits.

In witness whereof, I hereunto subscribe my name this 30th day of November, A. D. 1928.

HAROLD C. ROBINSON.